Figure 1:
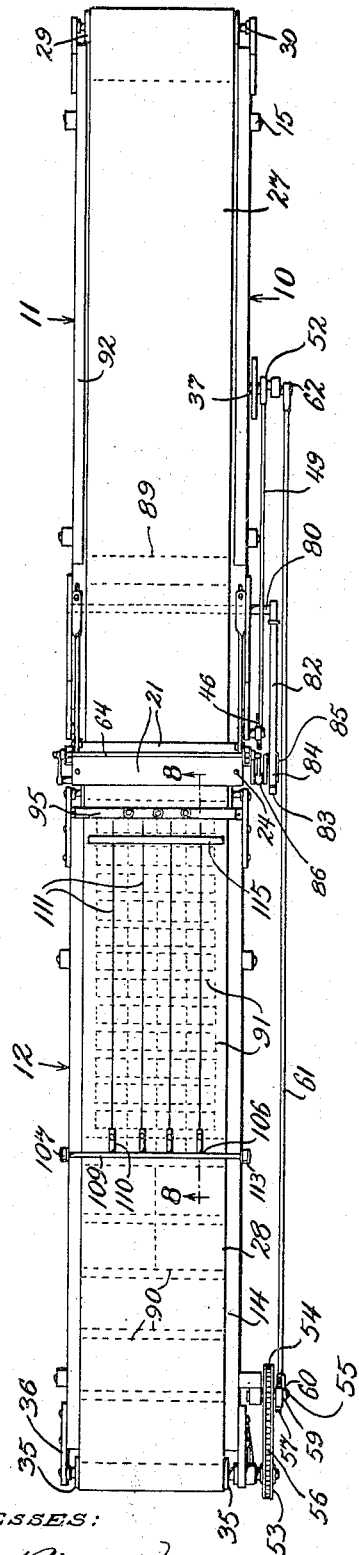

Nov. 11, 1924.

A. F. GANTZ 1,514,848

ICE CREAM BRICK CUTTER

Filed April 13, 1922   5 Sheets-Sheet 1

INVENTOR
Amos F. Gantz
BY Joshua R. H. Potts,
HIS ATTORNEY

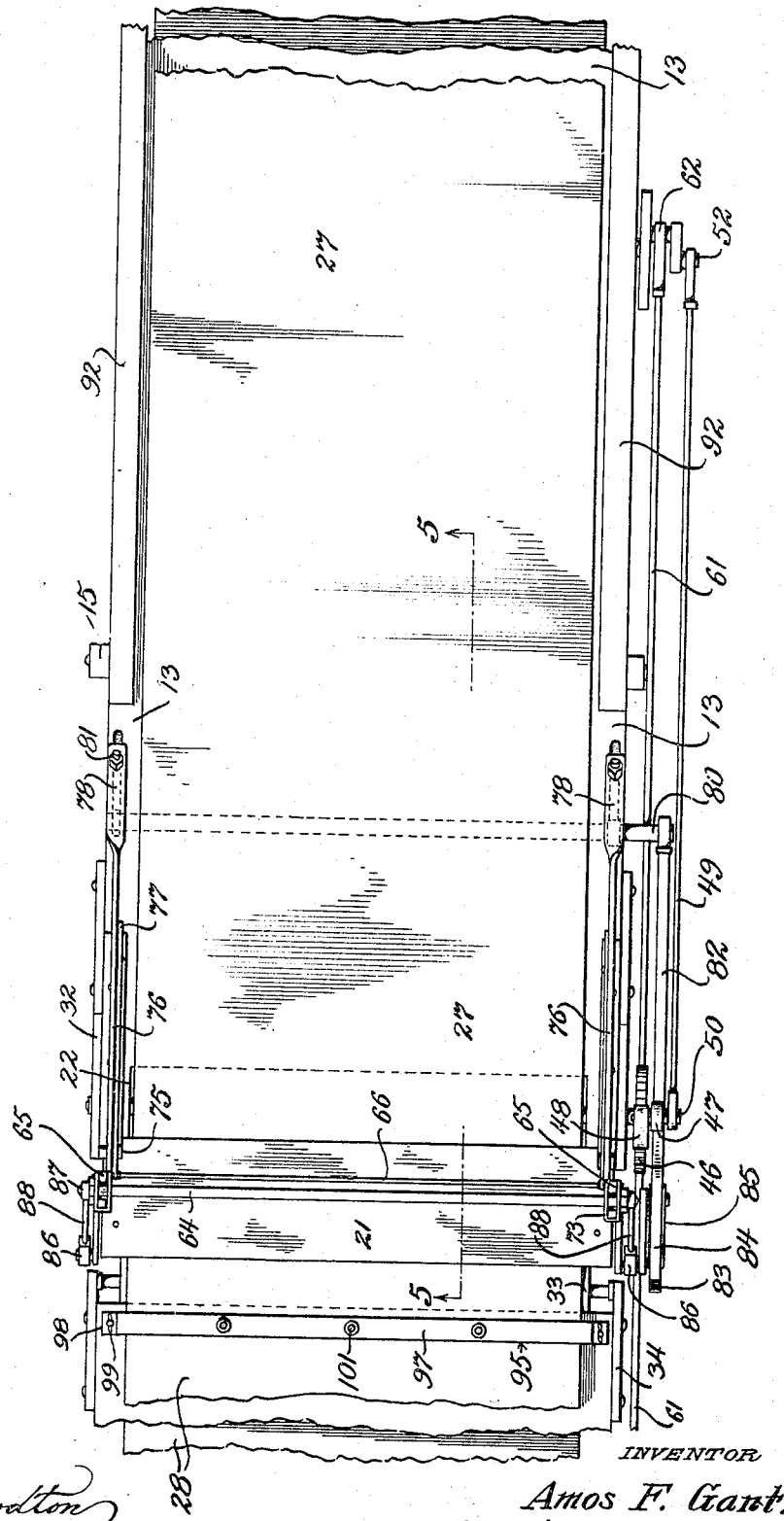

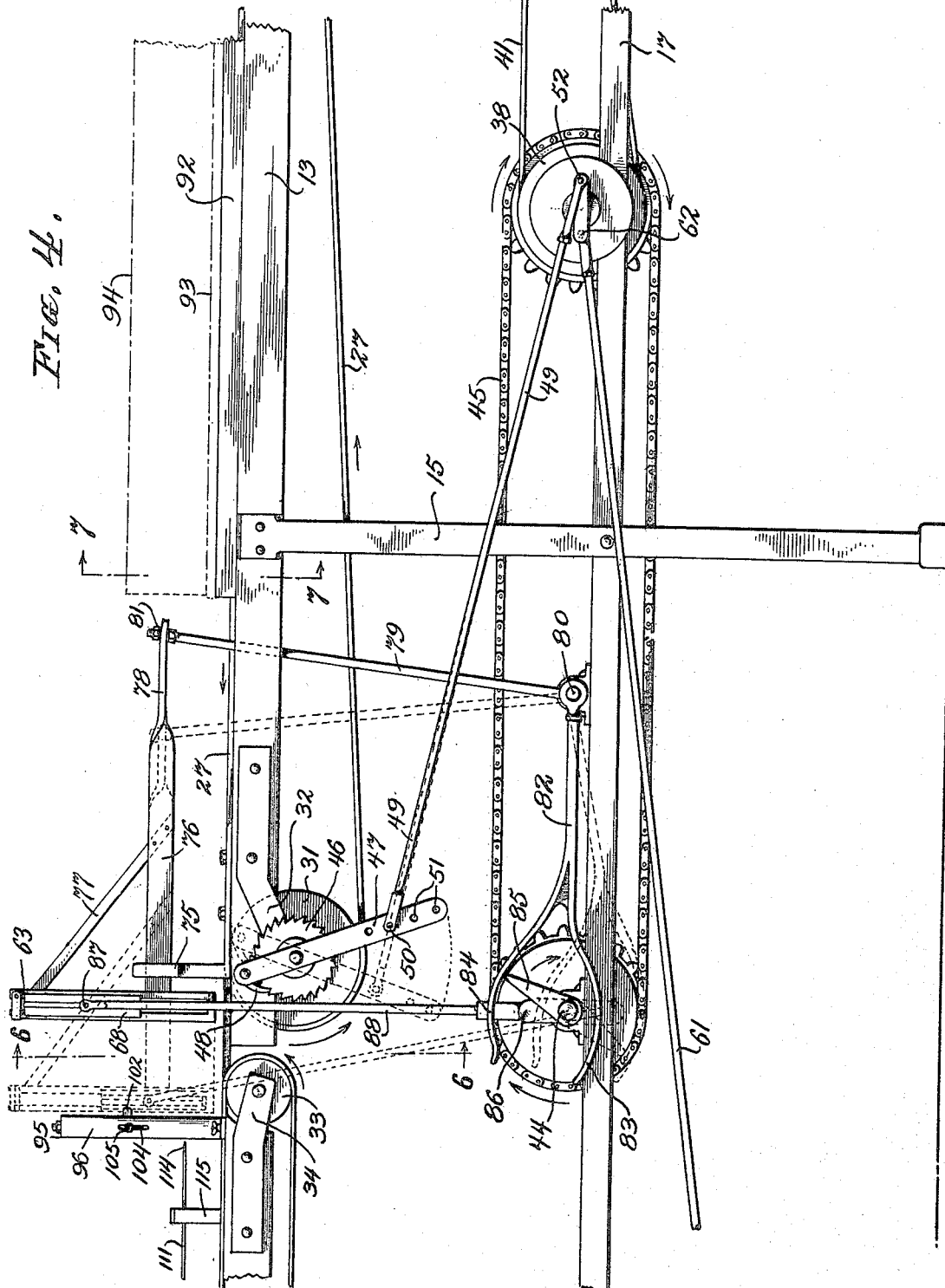

Nov. 11, 1924.
A. F. GANTZ
ICE CREAM BRICK CUTTER
Filed April 13, 1922
1,514,848
5 Sheets-Sheet 4
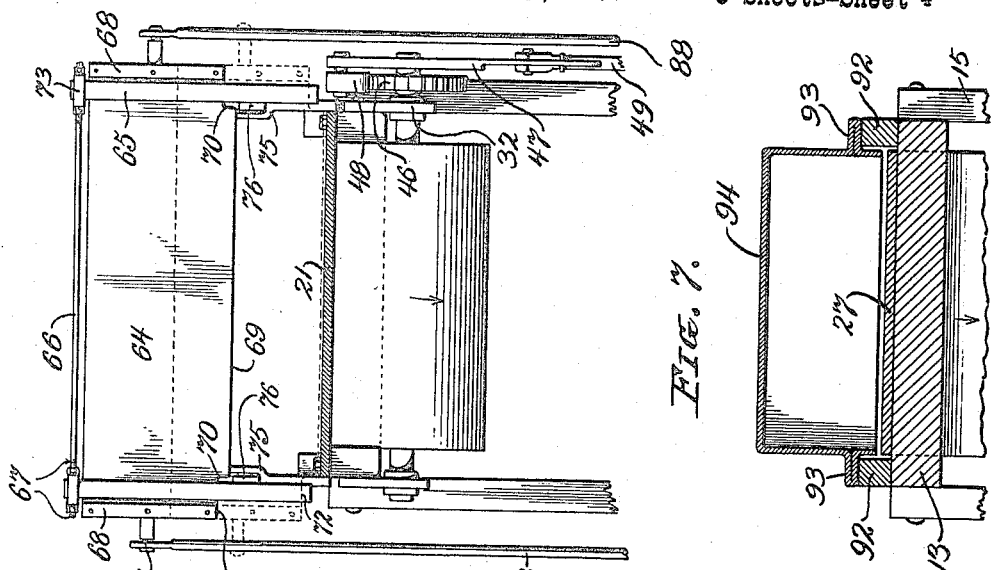
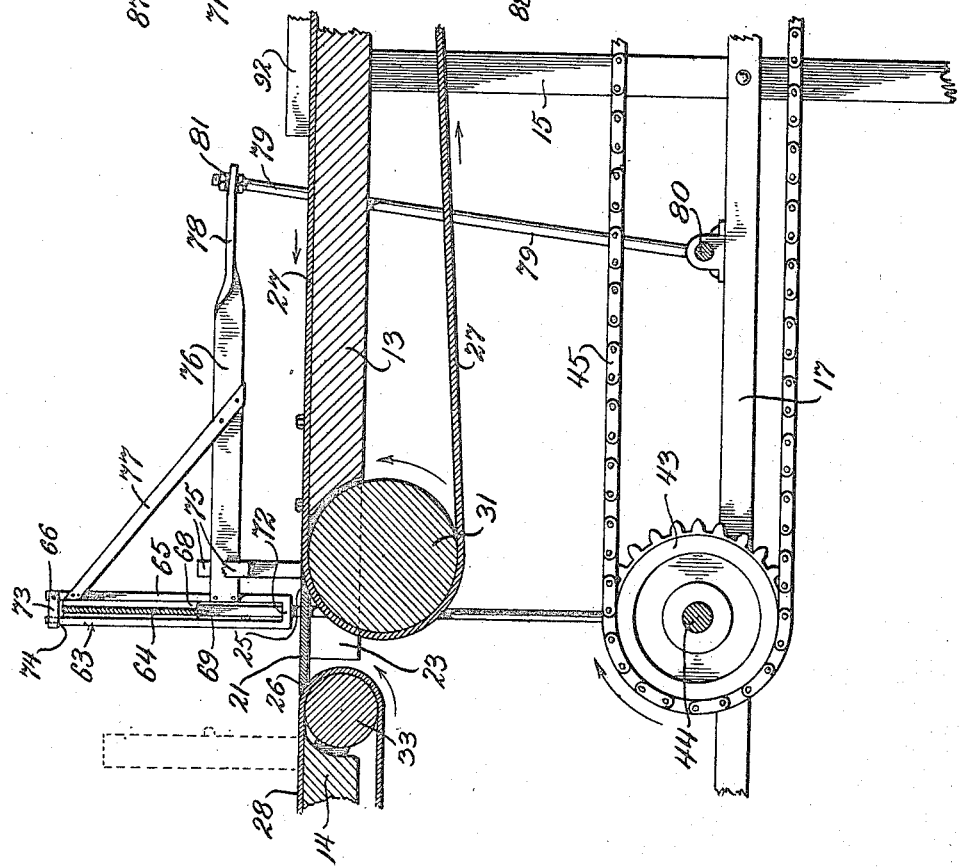
WITNESSES:
Lynn V Brodton
J. F. Burch
INVENTOR
Amos F. Gantz
BY Joshua R H Hobbs,
HIS ATTORNEY

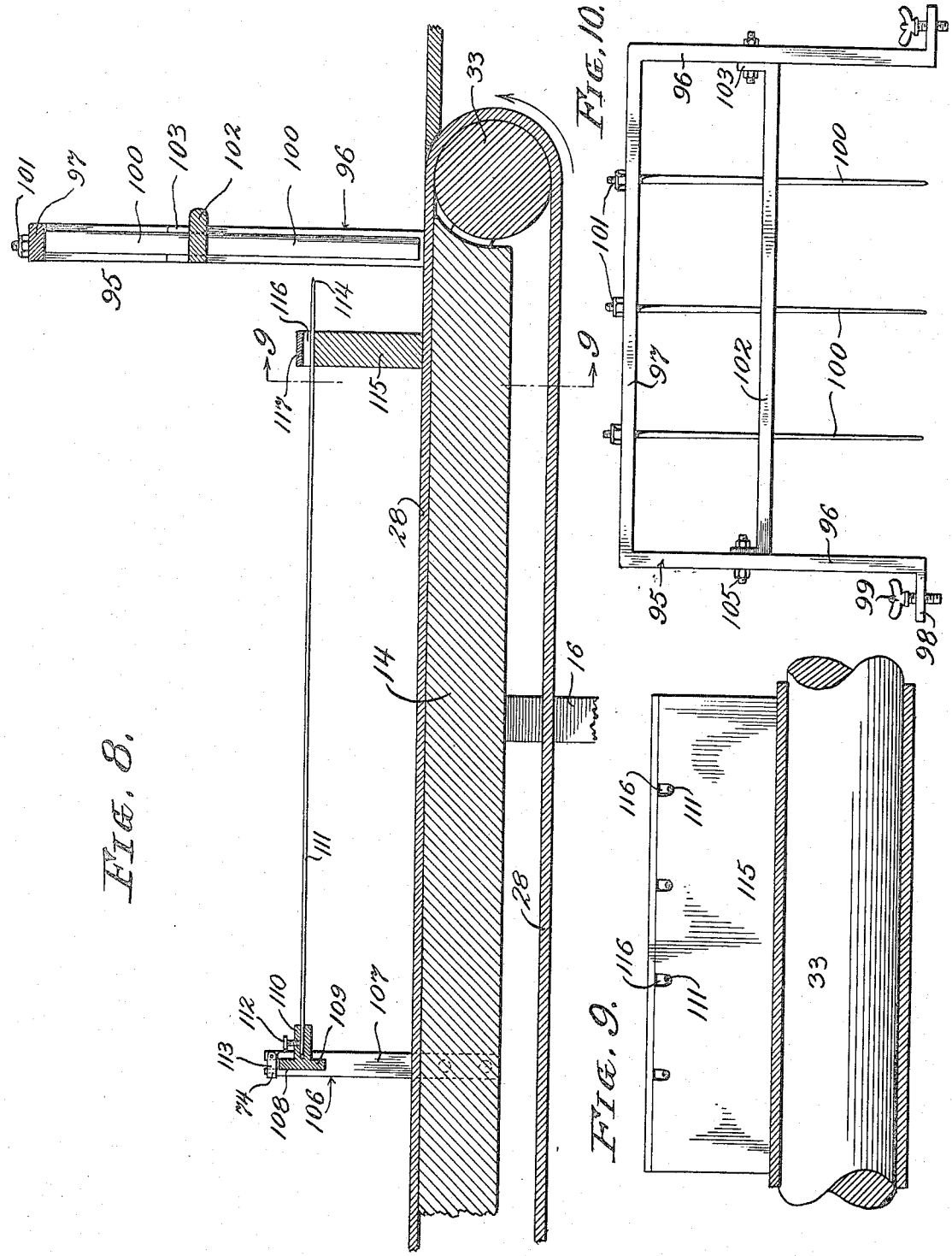

Patented Nov. 11, 1924.

1,514,848

UNITED STATES PATENT OFFICE.

AMOS F. GANTZ, OF WOODSTOWN, NEW JERSEY.

ICE-CREAM-BRICK CUTTER.

Application filed April 13, 1922. Serial No. 552,100.

*To all whom it may concern:*

Be it known that I, AMOS F. GANTZ, a citizen of the United States, residing at Woodstown, in the county of Salem and State of New Jersey, have invented certain new and useful Improvements in Ice-Cream-Brick Cutters, of which the following is a specification.

My invention relates to a machine for cutting blocks or slabs of ice cream or the like into bricks and the object thereof principally is to accurately and rapidly cut or divide the large block or slab into any desired size of bricks to be wrapped for protection and sale.

Another object of the invention is to provide a machine for cutting slabs or blocks of plastic or other relatively soft material, such as ice cream or other frozen materials, into smaller portions or bricks and to divide the bricks transversely into still smaller portions, and furthermore, to prevent adhesion or freezing together of the adjacent edges of the successive pieces thus cut by separating the bricks or pieces after being cut, thus also serving to facilitate gripping and wrapping thereof for removal from the separating and discharging table or conveyor, to be stored or boxed as desired.

A still further object of the invention is to provide a cutting or slicing machine particularly designed for cutting slabs or blocks of ice cream into bricks and which includes a feeding means or belt and a wrapping or discharging means or belt having independent driving means capable of adjustment to regulate the speed of transfer in the feeding and discharging action and distance between the separated bricks, in combination with novel cutting means for cutting the slab or block into bricks and cutting the bricks into smaller portions, while the feeding, cutting and discharging means are so related as to facilitate the cutting action; the block or slab being fed to a cutting position while the discharging means remains stationary, the cutting means being brought into play while both the feeding and discharging means are stationary, including the carrying means for the cutter, which carrying means serves in conjunction with the cutter or cutting blade to move or feed the severed bricks forward upon the spacing and discharging means, which latter means is brought into play to cause spacing or separation of the bricks or other severed pieces of ice cream or the like while the feeding means is stationary so as to prevent transverse adjacent edges of successive bricks or pieces from adhering or freezing together again after they have once been severed from the main slab or block and also to facilitate the further handling or wrapping of said severed pieces.

Other objects of the invention are to facilitate the cutting of the bricks into smaller pieces, the sizes of which may be varied as desired; to prevent adherence of the severed pieces or of the main block or slab of ice cream to the cutting knife which divides the slab longitudinally and to prevent the raising or adherence of the blocks with or to said knife or adherence to the knives which divide the bricks transversely; and to provide novel means whereby small blocks may be cut and arranged or strung upon supports or needles so that a plurality of such blocks as arranged upon one or more needles may be simultaneously dipped in chocolate or other material with which they are to be covered or coated, thereby greatly facilitating and cheapening the cost of production.

These objects, and other advantageous ends which will be described hereinafter, I attain in the following manner, reference being had to the accompanying drawings in which—

Figure 2:
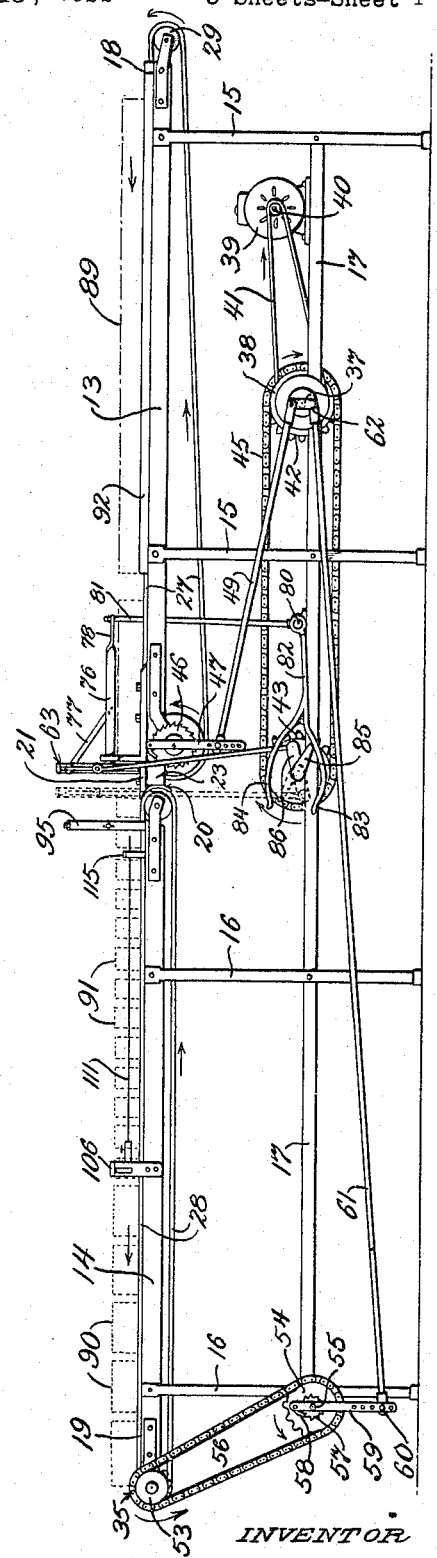

Figure 1 is a plan view of my improved ice cream brick cutter,

Figure 2 is a side elevation thereof and showing as Figure 1, the arrangement of the block or slab upon the table and belt and of the bricks or severed pieces upon the spacing and discharging table and belt, means being arranged upon the latter table for the purpose of supporting a plurality of bricks for dipping purposes, Figure 3 is an enlarged fragmentary plan view of the machine and showing the arrangement of the operating mechanism, Figure 4 is a side elevation of the device as shown in Figure 3, Figure 5 is a fragmentary vertical longitudinal sectional view taken on the plan of the line 5—5 of Figure 3, Figure 6 is a vertical transverse sectional view taken on the line 6—6 of Figure 4, Figure 7 is a view similar to Figure 6 but taken on the line 7—7 of Figure 4.

Figure 8 is an enlarged longitudinal vertical sectional view taken on the line 8—8 of Figure 1, Figure 9 is a transverse vertical sectional view taken on the line 9—9 of Figure 8, and Figure 10 is a face view of the cutting device shown at Figure 8.

Referring to the drawings in detail, in which for purposes of illustration is shown the preferred embodiment of the invention, and in which like reference characters designate corresponding parts throughout the several views, my improved ice cream brick cutter is shown as comprising a frame 10 including spaced tables or benches 11 and 12 constituting the receiving and feeding table, and the discharging and wrapping table respectively. These tables consist of tops or pressure boards 13 and 14 suitably supported at the proper elevation and in horizontal alignment contiguous to each other and preferably parallel to the floor or other supporting surface, as through the medium of the supporting frame including the legs 15 and 16 which are connected and braced longitudinally of the frame beneath the top portion thereof as through the medium of strips or rungs 17 also horizontally disposed. By this means, a rigid frame structure is provided and it should be noted in this connection that the same may be constructed of wood or metal, including the top portions, as desired.

As will be noted from the drawings. the tables have the tops 13 and 14 projecting at opposite ends of the frame as indicated at 18 and 19, and intermediately, the inner or adjacent ends of the tops are slightly spaced apart as indicated at 20 so as to produce a gap which is bridged by a bridge plate 21, the latter being preferably of sheet metal, such as copper, although I do not desire to be restricted to this material. As indicated, the inner end of the top 13 is centrally recessed as indicated at 22 so as to provide side extensions or furcations 23 across which the plate 21 is securely fastened at its ends, as indicated at 24. The opposite edges of the plate opposing the contiguous ends of the table tops are undercut or oppositely beveled as indicated at 25 and 26 for the purpose to be presently described.

Arranged to move in the same direction over the tables 13 and 14 are two endless carriers or traveling belts 27 and 28, the former constituting the receiving and feeding means or belt and the latter constituting the discharging and wrapping means or belt. The belt 27 is trained over a roller 29 projecting from the receiving end 18 and removably supported in bearings 30 and journaled to freely turn therein as well as to be conveniently removed and replaced. The roller 29 is arranged with its uppermost surface substantially on a plane so that the top surface of the table is slightly below it or substantially tangential thereto so that the top lap of the belt will extend over and freely move along the polished top surface of the table 13 while the other lap operates beneath the table top. The other end of the belt is trained around a driven roller 31 as distinguished from the idler roller 29, the roller 31 being journaled in similar downwardly off-set bearings 32 corresponding to the bearings 30 and preferably secured to the sides of the table top, while the roller 31 is disposed to operate in the recess or cut-out 22. The beveled end 25 of the bridge plate 21 will then fit the contour of the belt 27 as trained around the roller 31 so that the material will freely move off of the belt, as will be hereinafter more particularly set forth.

The belt 28 is trained around an idler roller 33 removably journaled in bearings 34 at the adjacent inner end of the table 14, in the same manner as the rollers 29 and 31 except that the latter roller is much larger in diameter and circumference. The beveled end 26 of the plate 21 is disposed adjacent the belt 28 as trained over the roller 33 and as the belts move in the same direction, the ice cream or other material will freely pass from the plate onto the upper lap of the belt 28 without catching or adhering. The lower lap of the belt 28 extends beneath the table 14 in the same manner as the lower lap of the belt 27 extends beneath the table 13, while the upper lap operates over and upon the polished upper surface of the table 14 and has its opposite end trained over a drive roller 35 removably journaled in bearings 36 at the remote end of the table 14 and downwardly off-set as are the bearings heretofore described.

In order to drive the belts 27 and 28 so that the speed of movement thereof may be adjusted and preferably so that the belt 28 will move faster or at a greater speed than the belt 27, suitable drive means are provided. As shown, a shaft 37 is journaled transversely of the machine, as in suitable bearings supported upon the bottom frame portion or strips 17 and may be rotated by hand or otherwise. This shaft is shown provided with a pulley 38 driven from a suitable prime mover such as electric motor 39 also supported upon the frame beneath the table and around the pulley 40 of which and the pulley 38, an endless guide belt 41 is trained so that the shaft 37 may be driven at the proper speed. Obviously, the shaft 37 may be driven from a line shaft or otherwise, though the driving means described is especially desirable and economical by reason of the use of individual motors and the economy with which the same can be employed.

Also mounted upon and fixed to the shaft 37 as is the pulley 38, is a pulley or sprocket wheel 42 and around this sprocket wheel and a sprocket wheel 43 fixed to a counter-shaft 44 also journaled transversely of the frame substantially beneath the plate 21 is an endless drive member or chain 45, thus driving the shaft 44 at a speed uniform with that of the shaft 37 in the construction shown wherein the sprocket wheels 42 and 43 are of the same size.

At one or both ends of the drive roller 31 is a ratchet wheel 46 fixed to rotate with the roller, and mounted to freely turn on the shaft or axis of the roller is a cross lever or arm 47 having a spring-pressed pawl 48 engaged with the beveled teeth of the ratchet wheel 46 at the short arm of the lever. The other or longer arm of the lever projects considerably below the roller and has adjustable connection with a rod 49, as through the medium of a pin 50 engaging a series of spaced apertures 51 in the arm whereby the leverage can be varied. The opposite end of the rod 49 is adjustably connected to a crank or crank pin 52 arranged upon the pulley or disk 38 of the shaft 37 so that during rotation of the latter, an intermittent or stepped movement is imparted to the belt 27 through the drive roller 31 during the oscillation of the cross arm or lever 47. This is due to the fact that the pawl 48 will ride over the teeth of the ratchet wheel 46 in one direction which would tend to move the belt rearwardly, and engages the teeth in the opposite direction so as to positively move the belt forwardly, the distance or degree of movement of the belt or by which it is stepped at each oscillation of the cross arm being regulated by the adjustable connection between the rod 49 and the cross arm.

Fixed upon the shaft of the roller 35 is a pulley or sprocket wheel 53 and around said sprocket wheel and a pulley or sprocket wheel 54 suitably fixed to a shaft 55 journaled at the discharge end of the frame, is an endless drive member or chain 56. The shaft 55 carries a ratchet wheel 57 engaged by a spring-pressed pawl 58 at one end of the cross arm 59 journaled on the shaft in the same manner as the cross arm 47 and adapted to similarly drive the shaft 55 through the medium of the ratchet gear. A similar adjustable connection 60 is provided between the longer arm of the cross arm or lever 59 and a connecting rod 61 at one end of the latter, corresponding to the pin and aperture connection heretofore described. The opposite end of the rod 61 is connected to a crank or other suitable actuating connection as indicated at 62 on the counter-shaft 37 and as the latter shaft is rotated, the oscillation of the arm 59 will through the ratchet connection cause intermittent rotation or oscillation of the shaft 55, thereby imparting intermittent or stepped movement to the belt 28, while the gearing is such as to drive the belt 28 faster than the belt 27. This can be effected in any desired way, or the throw of the cross arm or lever 59 may be made greater than that of the cross arm 47 so that the belt 28 will be moved a greater distance each time it is moved than will be the belt 27, and by arranging the connections 52 and 62 diametrically opposite, the belts will be alternately moved, that is, when the belt 27 is moving, the belt 28 will be stationary and vice versa. It is also to be understood that the drive mechanism may be varied so as to effect the proper relation between the speeds of movement of the belts 27 and 28 and to move the former while the latter is stationary or to move the latter while the former is stationary. The relative speeds of movement of the belts 27 and 28 may be properly regulated or proportioned so that the bricks or pieces of ice cream or other material as cut will be moved along the belt 28 and spaced apart or separated so as to prevent the transverse adjacent edges of the successive pieces from adhering or freezing together again after they have once been severed from the main block or slab, and also to facilitate the manipulation or handling of said severed bricks or pieces, as will be hereinafter more fully set forth.

As means for cutting the block or slab of ice cream or other plastic material into bricks or pieces, transversely of the platform or table of the frame, and thus the block or slab, and for moving or feeding the bricks forwardly from the receiving and feeding table and belt onto the discharging and wrapping table and belt, there is arranged over the inner or discharge ends of the table 13 and the belt 27, and also arranged to move over the bridge piece or plate 21, is a frame 63 comprising connected U-shaped side members or uprights serving as guides for a vertically reciprocating cutter blade or knife 64. The uprights or guides are designated at 65 and are indicated as adjustably connected by the transverse tension rod 66 preferably having threaded ends secured upon opposite sides of the opposed uprights as indicated at 67. Guiding and retaining strips 68 are arranged at the side edges of the cutter blade 64 and outwardly of the uprights 65 so as to slide along the latter during the vertical reciprocation of the cutter blade, which latter is limited in its downward movement in close proximity to but slightly spaced from the upper lap of the belt 27 and the bridge plate 21 so as to prevent engagement therewith and dulling or mutilation of the knife edge 69. For this purpose, the opposite lower corners of the knife blade are preferably recessed or cut-out as indicated at 70, the downwardly facing shoulders 71 thus produced engaging the bottom or connecting portions 72 of the uprights 65 as more clearly shown in Figures 5 and 6 of the drawings, for the purpose specified. The knife is rendered displaceable so that it may be removed for sharpening, repair or renewal through the open upper ends of the uprights 65, suitable U-shaped fasteners or clevises 73 being provided for this purpose and pivoted to the rod 66 at one portion of each upright and pivotally engaging and setting upon a shoulder 74 of the other portion as indicated in Figures 4, 5 and 6 of the drawings.

As means for slidably supporting the frame 63 and parts carried thereby for horizontal reciprocation, as distinguished from the vertical reciprocation of the cutter blade, slotted or forked bearings 75 extend upright from the side bearings or furcations of the table 13 and slidably receive therein arms 76 secured to the sides or uprights of the frame 63 and disposed vertically on edge but extending horizontally over the adjacent table and belt and braced to the upper portions of the uprights as by the diagonal braces 77. The free ends of the arms 76 are preferably twisted horizontally as indicated at 78 and apertured at the extremities for loose connection with the arms 79 of bell crank levers mounted on a pivot 80 carried by the frame structure beneath the table 13. The connections 81 between the arms 79 and the arms 76 preferably allow slight play or limited pivotal movement between said parts though the preferred action and tendency is to hold the sliding supports in proper relation with the arms 76 in the slotted bearings 75 and to prevent displacement relative thereto. In connection with the pivot shaft 80 and as part of the bell crank lever, there is provided a horizontally extending arm 82 having a forked end providing a lower camming track or cam surface 83 arranged eccentrically to the shaft 44 as a pivot and with the greatest eccentricity at the ends of the curved portion or cam. The other portion of the fork produces a cam surface 84, the free end of which is directed outwardly for initial engagement by a cam or actuating arm 85 fixed to the shaft 44. These camming portions 83 and 84 are preferably of a slightly resilient nature and the portion 84 has its point of greatest eccentricity toward its free end and gradually approaching a point of least eccentricity toward the crotch of the fork so that the camming portions or surfaces 83 and 84 will be alternately or intermittently engaged by the cam 85 for the purpose of reciprocating the frame 63 carrying the cutter blade 64 horizontally between the full and dotted line positions shown in Figure 4 of the drawings. Both camming portions are such that the graphs representing the speed and velocity curves but more specially representing the variation in the forces applied during the opposite movements of the frame, will be harmonic or gradual so as to produce the least possible vibration and so that the greatest pressure will be applied at the central position of the cam 85 with respect to the cam portion 83, being gradually increased and gradually decreased from minimum to maximum and then to minimum so as to move the arm 82 from the solid line position shown in Figure 4 of the drawings to the dotted line position, thus swinging the arms 79 forwardly and shifting the frame 63 over the bridge plate 21 to the dotted line position. The curve of the cam portion 84 is such that the greatest force or pressure is applied against the same by the cam 85 when in the position shown in full lines in Figure 4, such force starting at a minimum and gradually increasing until the intermediate crotch or bight portion of the fork is reached, so that the frame will be shifted from the dotted line position outwardly or rearwardly to the full line position and will remain in this position until the cam 85 again engages with the cam surface 83.

In the latter position of the frame the cutter blade 64 is moved downwardly to sever a portion of the slab and for this purpose, cranks 86 are provided on the shaft 44 and the opposite edges of the cutter blade are provided with trunnions 87 connected to the cranks 86 by rods 88. It will be noted that the frame 66 and cutter blade 64 are positioned above the shaft 44 and its cranks 86 and during the rotation of the shaft, the cutter blade will be reciprocated vertically in its guideways so as to move downwardly to a cutting position and sever a brick when the frame 63 is stationary or held against horizontal reciprocation and after the cutter has been completed the frame and cutter blade will be moved forwardly to advance the brick over the bridge plate 21 and upon the endless carrier or belt 28. The relation of the parts as above described is such that when the cutter blade is raised, the feed belt 27 operates to advance the slab beneath the cutter blade while the latter is stationary and when the cutter blade or knife is moved to sever the brick, the belt 27 is stationary while the belt 28 is moving to advance the previously severed brick, and by reason of moving at a greater speed or at a greater distance than the belt 27, the bricks will be spaced apart upon the belt 28. Of course, while the frame 63 is stationary, the cutting action is taking place and upon substantial completion of the latter, the frame has started to move forwardly and upon completion of the cutting action, the frame together with the cutter blade or knife, has completed its forward movement, the pressure of the cutter blade against the brick thus severed causing the advancement thereof from the feeding belt 27 across the bridge plate 21 and upon the removing and discharging belt 28, after which the cutter blade is raised and the frame returned to its original position for another cutting operation and during this action or return of the frame, the belt 28 will be stationary and the belt 27 will move forward to feed the slab while during the forward movement of the frame 63, the belt 27 will be stationary and the belt 28 will be operated to advance the bricks thereof in spaced relation in the manner shown in dotted lines in Figures 1 and 2 of the drawings. In these views, the slab or block is designated at 89 and the blocks or pieces severed at 90 and 91 will indicate different sizes cut by the device under different adjustments of the ratchet gear or feeding mechanism for imparting movements to the belts.

As a convenience in placing the slab or block 89 upon the receiving and feeding belt 27 over the table 13, rails 92 are mounted upon the table in parallel relation to each other along the opposite edges thereof and outwardly of the side edges of the belt so that the stops or ribs 93 at the sides of a pan 94 may be engaged upon the rails upon inverting the pan over the belt and table in position to discharge the block or slab forming its contents, upon the belt. This may be accomplished in the usual or any preferred manner, especial attention being called to the means whereby the pan may be supported in position to discharge the slab after heating or otherwise freeing the same, upon the belt, without injury to the belt or table, such as would interfere with the free movement of the belt.

As means for cutting or dividing the bricks thus severed from the slab by the transverse cutting of the blade or knife 64 when actuated as described, and at right angles to the cuts produced thereby so as to divide the bricks in pieces of different sizes and transversely of the slab by longitudinal cuts as distinguished from the transverse cuts produced by the blade 64, there is arranged upon the table 14 at its end adjacent to and contiguous with the table 13 and at the receiving end of the belt 28 and so as to straddle the latter, a frame 95 preferably of inverted substantially U-shaped conformation having side portions 96 and a top or connecting portion 97, said side portions or legs 96 having outwardly extending apertured feet or ears 98 through which securing means, such as screws 99, are passed for removably attaching the frame 95 to and upon the table 14 in an upright position. This frame carries a plurality of horizontally spaced and vertically arranged parallel cutting devices 100 which may be in the form of knives or wires placed under tension and anchored or attached to the top portion 97 as indicated at 101 and at their lower ends to the table 14 if desired.

A vertically adjustable cross brace 102 is provided to receive and intercept the knives or wires forming the cutting devices 100 being apertured for this purpose and having slotted angular ends 103 disposed to engage the sides 96 and secured in position through slots 104 in the sides 96 as by securing and clamping means 105. This construction permits vertical adjustment of the brace 102, which serves as a means of preventing the blocks severed from the slab from adhering to the cutter blade 64 and being raised by adhesion thereto as well as serving to scrape or remove the severed material or brick from the blade during the upward movement of the latter when in the dotted line position shown in Figure 4 of the drawings. If desired, the edge of the brace 102 may project from the frame 95 carrying the stationary cutting devices or knives 100 and may be used as a means of calibration of the sides 96 of the removable frame 95, in addition to the adjustment of said brace and scraper to accommodate slabs of varying thicknesses. It is of course to be understood that when the frame 63 and the cutter blade 64 are advanced from the full line position shown in Figure 4 to the dotted line position shown in said figure and toward the frame 95 and cutting devices 11, that the bricks as severed by the blade 64 will be forced against the cutting devices 100 below the brace 102 and such bricks or pieces will be cut into smaller pieces and delivered upon the belt 28. The size of these pieces may be regulated by mounting the cutting devices 100 in different positions or removing the outer ones while leaving the central one in position, or otherwise varying the number and spacing thereof, as it is thought will be readily understood. Of course, the size of the brick severed from the slab will be varied according to the degree of movement imparted to the feed belt 27 and the distance which the slab projects in advance or forwardly of the cutter blade 64 before the latter is operated to sever the same. This object may be accomplished by varying the movement of the frame 63 or by changing the position of the connecting rod 49 in the long arm of the cross arm or lever 47 through the medium of the pin and apertures or other adjustable connections of a similar nature provided at this point. The vertical reciprocation of the cutter blade 64 may also be adjusted to prevent the cutting edge thereof striking the plate but sufficiently to give a clean cut. The adjustment of the throw of the cross arm 47 and corresponding adjustment of the rod 61 with respect to the cross arm 59 will regulate the speed of operation of the belts and the distance which they are advanced as heretofore described, and by reason of the drive connections thereto, operating at a greater speed or moving a greater distance at each intermittent or stepped movement thereof than the belt 27 so that the bricks depending upon the width thereof will be spaced apart upon the belt 28 to be discharged and wrapped by any suitable wrapping machine provided for this purpose or to be conveniently grasped by an attendant with the proper wrapping paper to be folded in position to wrap or cover the bricks as discharged. This is true whether the bricks are severed into smaller pieces by the cutting devices 100 or not and it is obvious that the bricks may be produced in quarts, pints or other appropriate sizes which may in addition be cut into pieces as required upon any particular occasion.

As a facility for dipping small bricks or pieces in chocolate or other material with which they are to be covered, in lieu of dipping the same one at a time or singly, a removable frame 106 is mounted or adapted to be mounted over the belt 28 at any desired position along the length thereof, said frame including spaced uprights 107 having slots 108 in the upper ends thereof for receiving a cross bar 109 having a series of projections 110 at one side with sockets for receiving common ends of needles or wires 111 which are clamped in position in any suitable manner as by means of set screws 112 so as to render the same readily detachable from the sockets of the cross bar. The cross bar may be retained in position in the slots 108 at the upper ends of the uprights of the frame as by means of U-shaped retainers or clevises 113 pivoted to certain of the furcations produced by the slots and engaging the opposite shouldered portions under tension or friction as do the clevises 73, so that displacement of the parts retained in position thereby will be prevented. The needles or wires 111 are straight and constitute holding devices extending rearwardly over the belt 28 toward the receiving end thereof and the cutting devices heretofore described so that the free ends 114 are disposed in juxta-position to the cutting devices 100 and to extend in spaced parallel relation to each other equidistantly between the cutting devices 100 and the outermost of said devices and the sides of the frame 95. In this position, they are preferably supported by an upright grooved block 115 which rests upon and moves with the upper lap of the belt 28; the needles 111 resting in the grooves 116 extending transversely across the top edge of the block 115 and retained in this position by a block or plate 117 placed upon the upper edge of the block 115 and over the needles. This device constitutes a follower which when placed under the needles serves to support the latter in horizontal or substantially horizontal positions and so as to engage the bricks or pieces as cut and forced into the same so as to arrange them in slightly spaced relation as strung upon the supports produced by the wires or needles 111. As the bricks or pieces are fed forward upon being discharged by the cutting mechanism and the belt 28 after being severed and cut, they engage the follower produced by the blocks so that the latter is moved along with the first bricks extending across the width of the machine so that the bricks are simultaneously strung upon the needles, preferably twelve on each needle or forty-eight in all, although I do not desire to be restricted to the capacity stated for it is to be understood that the needles may be as long or as short as desired, or as practice may dictate. The principal feature is that the small bricks or pieces of ice cream as strung on the needles may be simultaneously dipped in chocolate or other coating material of a similar nature, or each individual needle removed for dipping the supported bricks thereof, thus greatly facilitating the coating or dipping operation over the present method of dipping the bricks separately or singly for producing chocolate coated ice cream or other similar confections.

In the operation of the machine, the shaft 37 is rotated in any suitable manner as by the motor 39 or may be driven by hand or otherwise. As shown, the operation of the motor 39 transmits rotation to the shaft 37 through the belt 41 and the shaft 44 is in turn rotated through the drive connection with the shaft 37 produced by the sprocket wheels 38 and 43 and the needles, drive member or chain 45. While the shaft 37 is rotating, the connecting rods 49 and 61 are reciprocated to cause oscillation of the cross arms 47 and 59 in oppositely timed relation so as to intermittently and alternately impart movement to the traveling belts 27 and 28 respectively. At the same time, due to the rotation of the shaft 44, the cutter blade or knife 64 is caused to reciprocate vertically in its frame or bearings through the medium of the crank rods 88 connecting the trunnions of the cutter blade with the cranks 86. At the same time, the cam 85 is rotated and alternately engages the cam surfaces 83 and 84 with an intermediate intermittent inactive position so that the frame 63 of the cutter blade 64 remains stationary while the cutter blade is being lowered, the cam 85 being between the cam surfaces 83 and 84 at the bight portion produced thereby and while the crank 86 is on its downward swing. When the cam 85 engages the surface 83, the frame and blade are moved forward after the cutting operation and the engagement of the cam 85 with the cam surface or track 84 causes the return of the frame and blade to cutting position. With the parts operating as described, a pan, such as 94, containing the block or slab of ice cream, cake or other plastic material, is arranged in position over the receiving and feeding belt 27 with the stops or ribs 93 resting upon the supports or side rails 92 in such position as to hold the lower edge of the pan in spaced relation to the belt. The contents of the pan are forced out onto the belt 27 partly supported or sustained by the table 13 and as the belt is moved forwardly, the slab is caused to project at the proper time beneath the blade 64 when in the raised position shown in Figures 5 and 6 of the drawings. While the belt is stationary, the knife or blade 64 is brought down to sever a portion of the block or slab transversely so that it may be divided longitudinally into a series of bricks or pieces of the required size and as desired, according to the regulation of the distance which the belt 27 moves and thereby the distance which the slab projects from beneath and beyond the blade 64. When the blade 64 has moved downwardly and severed a portion of the slab to produce the brick, the belt 28 is then started and the frame 63 and blade 64 are moved forward to advance the brick cut upon the plate 21 to a position upon the belt 28 where it may be grasped for wrapping by hand or discharged into a suitable wrapping machine or device for this purpose.

By having the belt 28 which constitutes the discharging means, move faster than the belt 27 constituting the feeding means, or to travel a greater portion or proportion of its length or than the distance traveled by the belt 27, the bricks will be spaced apart upon the belt 28 so that they may be conveniently grasped by an attendant preferably with a covering of paper which may produce the wrapper. This prevents adhesion of the bricks to one another as does also the advancing movement of the frame 63 and its cutter blade in bridging the gap between the two belts where the material and especially ice cream, would be likely to freeze and adhere, such as to the blade 64 and the plate 21.

When the cutting devices 100 are in use for cutting the bricks into smaller pieces longitudinally so as to divide the same transversely of the machine or slab, the bricks are forced into the cutting devices upon the advancing movement of the frame 63 and are thereby cut and fed onto the belt 28 in the same manner as heretofore described, after which they may be wrapped as explained.

Should it be desired to cut the bricks into small pieces or smaller bricks for dipping, the needles 111 are arranged in position as described and after the pieces of ice cream are fed or strung onto the same against the action of the follower which supports the free ends of the needles and is produced primarily by the block 115, the machine is stopped as by suitable means controlling the operation of the motor 39 or otherwise stopping the rotation of the shaft 37 and then all of the needles are removed and the small pieces or bricks of ice cream or other material as arranged thereon are dipped. On the other hand, the wires may be removed singly for simultaneously dipping the bricks which they carry, but in either event the operation is greatly facilitated over the present method generally practiced.

After each brick is severed and carried forward, the block is carried forward for the severance of another brick by the vertically reciprocating knife and it should be noted that this severance takes place over the bridge plate 21 so that injury to the belt is prevented such as would occur if the belt were running beneath the cutter blade or knife. Furthermore, by supporting the plate 21 upon the spaced portions or furcations of the table 13, a positive relation will be maintained between the undercut or beveled end of the plate 21 and the adjacent or discharge end of the belt 27. This is important since the material is fed toward the edge of the plate 21 which is arranged tangentially over the belt 27 whereas the opposite edge of the plate is arranged over the belt 28 and the material discharges from upon the plate 21 under the belt 28 away from the edge instead of toward it.

This construction will prevent shearing or catching of the slab or block previously to being cut and which would obviously interfere with the operation of the machine. This operation is continued until the entire slab is cut, when another slab may be placed upon the feeding belt and the operation continued. By varying the lengths of the belts and tables, the capacity of the machine can be regulated or greatly increased since by having the parts longer, a larger number of attendants may be accommodated in handling the bricks for wrapping, though ordinarily but one or two attendants will be required, since the number may also be reduced by providing a suitable wrapping device in conjunction with the discharging means, such wrapping devices being of any preferred or well known construction. Thus, the machine will obviate the necessity of handwork and guessing in cutting the bricks and separating the same, thereby insuring accurate and economical measurement as well as cleanliness and the maintenance of a highly sanitary product.

The parts of the machine may be readily cleaned to carry out this purpose and in addition, the operation is such as to insure a large capacity consistent with the other many factors referred to and for accomplishing the various objects specified.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. An ice cream brick cutter including a feeding device and a discharging device; a bridge plate between the feeding and the discharging devices; a cutter disposed above the bridge plate, means for actuating the cutter vertically to sever a block and means for actuating the cutter horizontally to move the severed part onto the discharging device.

2. An ice cream brick cutter including a feeding device and a discharging device mounted in alignment and spaced apart; a bridge plate closing the space between the feeding and the discharging devices; a cutter disposed above the bridge plate; means for actuating the cutter vertically to sever a block, and means for actuating the cutter horizontally to move the severed part onto the discharging device.

3. A cutter of the class described comprising a feeding device; a discharging device; a cutter between said devices and serving as a transfer means to move the cut material onto the discharging device, said cutting device serving to sever the material in one direction; and an additional cutter engaging the material as passed onto the discharging device so as to sever the same in another direction; substantially as described.

4. A cutter of the class described including a feeding device; a discharging device, the feeding and discharging means having intermittent movement; a cutting device adapted to sever the material in one direction, and a cutting device adapted to sever the material in a transverse direction, the discharging device serving to move the severed pieces in spaced relation while the feeding device is inactive, substantialy as described.

5. A cutter of the class described comprising a feeding device; a discharging device; a cutter between said devices, said cutting device serving to sever the material in one direction, said feeding and discharging devices having intermittent movement, said cutting device serving to sever the material transversely; and a cutter engaged by the pieces severed transversely upon movement thereof onto the discharging device to sever said pieces longitudinally; substantially as described.

6. A cutter of the class described comprising a feeding device; a discharging device; a cutter between said devices and serving as a transfer means to move the cut material onto the discharging device, said cutting device serving to sever the material in one direction, said feeding and discharging devices having intermittent movement, said cutting device serving to sever the material transversely; and a cutter engaged by the pieces severed transversely upon movement thereof onto the the discharging device to sever said pieces longitudinally; substantially as described.

7. A cutter of the class described comprising a feeding device; a discharging device; a cutter between said devices and serving as a transfer means to move the cut material onto the discharging device, said cutting device serving to sever the material in one direction, said feeding and discharging devices having intermittent movement, said cutting devices serving to sever the material transversely; and a cutter engaged by the pieces severed transversely upon movement thereof onto the discharging device to sever said pieces longitudinally, said discharging device moving a greater distance at each intermittent movement than the feeding device; substantially as described.

8. A cutter of the class described comprising a feeding device; a discharging device; a cutter between said devices and serving as a transfer means to move the cut material onto the discharging device, said cutting device serving to sever the material in one direction, said feeding and discharging devices having intermittent movement, said cutting devices serving to sever the material transversely; a cutter engaged by the pieces severed transversely upon movement thereof onto the discharging device to sever said pieces longitudinally; and means arranged upon the discharging device to receive and support the severed pieces in spaced relation to permit simultaneous treatment thereof; substantially as described.

9. In a machine of the character described, a feeding device; a discharging device; and a cutter interposed between said devices and movable to transfer the cut material from the feeding device to the discharging device, said feeding device being movable while the discharging device is stationary and vice versa, said cutting device being stationary with respect to the direction of feed of the feeding device during the cutting operation and while the feeding device is stationary; substantially as described.

10. In a machine of the character described, a feeding device; a discharging device; and a cutter interposed between said devices and movable to transfer the cut material from the feeding device to the discharging device, said feeding device being movable while the discharging device is stationary and vice versa, said cutting device being stationary with respect to the direction of feed of the feeding device during the cutting operation and moving thereafter to transfer the severed piece onto the discharging device, said discharging device being then movable to discharge the material thus cut; substantially as described.

11. In a machine of the character described, a feeding device; a discharging device; and a cutter interposed between said devices and movable to transfer the cut material from the feeding device to the discharging device, said feeding device being movable while the discharging device is stationary and vice versa, said cutting device being stationary with respect to the direction of feed of the feeding device during the cutting operation and moving thereafter to transfer the the severed piece onto the discharging device, said discharging device being then movable while the feeding device is stationary, after which said discharging device is stationary and the feeding device movable to advance the material to be cut, said cutting device being returned to a cutting position during the advancement of said material and operated to cut the same while the feeding means is stationary; substantially as described.

12. In a machine of the character described, a feeding device; a discharging device; and a cutter interposed between said devices and movable to transfer the cut material from the feeding device to the discharging device, said feeding device being movable while the discharging device is stationary and vice versa, said cutting device being stationary with respect to the direction of feed of the feeding device during the cutting operation and moving thereafter to transfer the severed piece onto the discharging device, said discharging device being then movable while the feeding device is stationary, after which said discharging device is stationary and the feeding device movable to advance the material to be cut, said cutting device being returned to a cutting position during the advancement of said material and operated to cut the same while the feeding means is stationary; a plurality of cutting devices for severing the material longitudinally as delivered from the feeding device to the discharging device by the cutting and serving as means to prevent adhesion of the material to parts engaged therewith after the transfer; means for adjusting the movements of the feeding device; and means for adjusting the movements of the discharging device; substantially as described.

13. In a machine of the character described, a feeding device; a discharging device; and a cutter interposed between said devices and movable to transfer the cut material from the feeding device to the discharging device, said feeding device being movable while the discharging device is stationary and vice versa, said cutting device being stationary with respect to the direction of feed of the feeding device during the cutting operation and moving thereafter to transfer the severed piece onto the discharging device, said discharging device being then movable while the feeding device is stationary, after which said discharging device is stationary and the feeding device movable to advance the material to be cut, said cutting device being returned to a cutting position during the advancement of said material and operated to cut the same while the feeding means is stationary; a plurality of cutting devices for severing the material longitudinally as delivered from the feeding device to the discharging device by the cutting and serving as means to prevent adhesion of the material to parts engaged therewith after the transfer; common means for driving said parts; and a series of devices arranged over the discharging means for supporting the cut pieces as discharged in a common plane; substantially as described.

14. In a machine of the character described, a feeding device; a discharging device; and a cutter interposed between said devices and movable to transfer the cut material from the feeding device to the discharging device, said feeding device being movable while the discharging device is stationary and vice versa, said cutting device being stationary with respect to the direction of feed of the feeding device during the cutting operation and moving thereafter to transfer the severed piece onto the discharging device, said discharging device being then movable while the feeding device is stationary, after which said discharging device is stationary and the feeding device movable to advance the material to be cut, said cutting device being returned to a cutting position during the advancement of said material and operated to cut the same while the feeding means is stationary; a plurality of cutting devices for severing the material longitudinally as delivered from the feeding device to the discharging device by the cutting and serving as means to prevent adhesion of the material to parts engaged therewith after the transfer; and means arranged over the discharging device and supported to engage the severed pieces of material so as to string the same retilinearly in spaced relation as cut and discharged, said devices being removable from over the discharging means; substantially as described.

15. In an ice cream brick cutter, a frame; a pair of intermittently operated conveyors mounted upon the frame, one of said conveyors constituting a receiving and feeding conveyor and the other a distributing and wrapping conveyor; means upon the frame for receiving a container for a slab to be cut whereby said slab may be placed upon the feeding conveyor, the movements of the conveyors being adjusted so that the distributing conveyor moves faster than the feeding conveyor; and a plurality of cutters to sever the slab into pieces as fed and discharged; substantially as described.

16. In an ice cream brick cutter, a frame; a pair of intermittently operated conveyors mounted upon the frame, one of said conveyors constituting a receiving and feeding conveyor and the other a distributing and wrapping conveyor; means upon the frame for receiving a container for a slab to be cut whereby said slab may be placed upon the feeding conveyor; a bridge piece carried by the frame and bridging the gap between the conveyors whereby the material may be transferred from the feeding conveyor to the discharging conveyor; and a cutting device at the discharge end of the feeding conveyor and including a frame movable after the severance of the material to deposit the same upon the discharging conveyor and returnable thereafter to a cutting position; substantially as described.

17. In an ice cream brick cutter, a frame; a pair of intermittently operated conveyors mounted upon the frame, one of said conveyors constituting a receiving and feeding conveyor and the other a distributing and wrapping conveyor; means upon the frame for receiving a container for a slab to be cut whereby said slab may be placed upon the feeding conveyor; a bridge piece carried by the frame and bridging the gap between the conveyors whereby the material may be transferred from the feeding conveyor to the discharging conveyor; a cutting device at the discharge end of the feeding conveyor and including a frame movable upon the discharging conveyor and returnable thereafter to a cutting position, said cutting device and frame moving across the bridge piece; means for limiting the movement of the cutter toward the bridge piece; and means for severing the material thus cut into smaller pieces during the movement thereof with the discharging conveyor, said means serving to prevent displacement of the cut pieces with the cutting device; substantially as described.

18. In a cutter of the class described, means for receiving and supporting a slab to be cut; means for advancing said slab intermittently; means for severing the slab into sections as advanced; and receiving means for the sections to discharge the same in spaced relation, said means having means for stringing the sections; substantially as described.

19. The combination with an ice cream brick cutter having means for spacing the bricks as cut; of means for receiving and arranging the bricks upon supports whereby they may be handled simultaneously in series; substantially as described.

20. In an ice cream brick cutter, the combination with advancing means; of a cutting device having vertically reciprocating movement; a discharging device; and means for moving the cutting device bodily to transfer the material cut to the discharging device and return the same to its initial position, said cutting device including a frame and a blade, said frame being bodily immovable during the cutting operation; substantially as described.

In testimony whereof I have signed my name to this specification in the presence of two subscribing witnesses.

AMOS F. GANTZ.

Witnesses:
DUDLEY C. PANCOAST,
JOSEPH K. DEMARIS.